US012793369B2

(12) United States Patent
Chiu et al.

(10) Patent No.: US 12,793,369 B2
(45) Date of Patent: Nov. 10, 2026

(54) EVIDENCE SYSTEM FOR DANCE COPYRIGHT BASED ON VIRTUAL AVATAR AND METHOD THEREOF

(71) Applicants: SQ Technology (Shanghai) Corporation, Shanghai (CN); Inventec Corporation, Taipei (TW)

(72) Inventors: Chuan-Cheng Chiu, Taipei (TW); Ta-Wei Yen, Taipei (TW); Yan-Ming Chen, Taipei (TW)

(73) Assignees: SQ Technology (Shanghai) Corporation, Shanghai (CN); Inventec Corporation, Taipei City (TW)

( * ) Notice: Subject to any disclaimer, the term of this patent is extended or adjusted under 35 U.S.C. 154(b) by 95 days.

(21) Appl. No.: 19/021,111

(22) Filed: Jan. 14, 2025

(65) Prior Publication Data

US 2026/0127834 A1 May 7, 2026

(30) Foreign Application Priority Data

Nov. 1, 2024 (CN) ......................... 202411557289.7

(51) Int. Cl.

*G06T 19/20* (2011.01)
*G06T 13/40* (2011.01)
*H04L 9/00* (2022.01)
*H04L 9/08* (2006.01)
*H04L 9/32* (2006.01)

(52) U.S. Cl.

CPC .............. *G06T 19/20* (2013.01); *G06T 13/40* (2013.01); *H04L 9/0825* (2013.01); *H04L 9/3236* (2013.01); *H04L 9/3247* (2013.01); *H04L 9/50* (2022.05); *G06T 2219/2004* (2013.01)

(58) Field of Classification Search

None

See application file for complete search history.

(56) References Cited

U.S. PATENT DOCUMENTS

| | | | | |
|---|---|---|---|---|
| 11,546,322 | B1 * | 1/2023 | Hardjono | H04L 67/131 |
| 12,182,820 | B2 * | 12/2024 | Markh | G06Q 20/405 |
| 2022/0080260 | A1 * | 3/2022 | Zhang | A63B 24/0062 |
| 2022/0277506 | A1 * | 9/2022 | Lagrone | A63F 13/213 |
| 2023/0090253 | A1 * | 3/2023 | Meadows | H04L 67/12 345/419 |
| 2025/0166834 | A1 * | 5/2025 | Elor | A61B 5/744 |

FOREIGN PATENT DOCUMENTS

| | | | | |
|---|---|---|---|---|
| JP | 7440980 B1 * | 2/2024 | | G06Q 50/18 |

* cited by examiner

*Primary Examiner* — James A Thompson

(57) ABSTRACT

An evidence system for dance copyright based on virtual avatar and a method thereof are disclosed. In the system, a user posture is captured through sensors and a motion capture technology, the user posture is combined with a imaging technology to generate a virtual avatar, and a motion of the virtual avatar is kept consistent with the user posture; after the virtual avatar is generated, the motion of the virtual avatar can be dynamically adjusted and an adjustment record corresponding thereto is generated, the input of a choreography note is allowed; the user posture, the adjustment record, and the choreography note together are stored as a dance evidence message, which is then signed and deployed to the blockchain network as an evidence basis for dance copyright. Therefore, the technical effect of improving the evidence convenience and undeniability of a dance copyright can be achieved.

10 Claims, 5 Drawing Sheets

400

[
{
"Time sequence message" : "10:00:00",
"Position vector message" : [x1, y1, z1],
"Posture vector message" : [qx1, qy1, qz1, qw1],
"Velocity and acceleration message" : [vx1, vy1, vz1, ax1, ay1, az1],
"Choreography note" : "First motion……"
}
]

EVIDENCE SYSTEM FOR DANCE COPYRIGHT BASED ON VIRTUAL AVATAR AND METHOD THEREOF

BACKGROUND OF THE INVENTION

1. Field of the Invention

The present invention relates to an evidence system and a method thereof, more particularly to an evidence system for a dance copyright based on a virtual avatar and a method thereof.

2. Description of the Related Art

In recent years, with the rise in awareness of copyright protection, various technologies for evidence collection related to copyright have emerged rapidly. However, copyrights comprise many types, such as literary copyrights, musical copyrights, drama copyrights, dance copyrights, visual arts copyrights, photography copyrights, graphic copyrights, video copyrights, sound recording copyrights, architectural copyrights, and computer program copyrights. For some types of copyrights, it is relatively easy to produce evidence, such as literary copyrights and photographic copyrights; however, for another copyrights, such as drama copyrights and dance copyrights, it is relatively difficult.

Conventional evidence production methods often rely on paper documents and audio or video recordings. For example, a dance creator (or a choreographer) usually needs to provide performance records, and a choreography note as evidence for dance copyright. However, the above-mentioned conventional methods may produce evidence in certain situations, and they often fail to ensure the authenticity and completeness of the evidence. This means that a dance creator may lack sufficient legal support in copyright disputes. Furthermore, conventional performance records and the choreography note are prone to omissions and often fail to fully capture the entire choreography process, making it even more challenging to provide evidence for dance copyright.

According to above-mentioned contents, what is needed is to develop an improved solution to solve the problem of inconvenience and insufficient evidence strength in dance copyright evidence.

SUMMARY OF THE INVENTION

An objective of the present invention is to disclose an evidence system for dance copyright based on virtual avatar and a method thereof, to solve the conventional problem.

To achieve the objective, the present invention discloses an evidence system for dance copyright based on virtual avatar, and the evidence system includes a motion capture device and a computer host. The motion capture device is configured to continuously capture a user posture through sensors and a motion capture technology, wherein the user posture comprises a position vector message, a posture vector message, a velocity and acceleration message, and a temporal sequence message. The computer host is connected to the motion capture device and connected to a blockchain network and served as one of node hosts of the blockchain network, and the computer host includes a non-transitory computer-readable storage medium and a hardware processor. The non-transitory computer-readable storage medium is configured to store computer readable instructions, a creator private key and a creator public key corresponding to the stored creator private key. The hardware processor is electrically connected to the non-transitory computer-readable storage medium, and configured to execute the computer readable instructions to operate: receiving the user posture captured by the motion capture device, and combining the user posture with an imaging technology to generate a virtual avatar, wherein the virtual avatar maintains motion consistent with the user posture; after the virtual avatar is generated, allowing adjustment of at least one of the position vector message, the posture vector message, the velocity and acceleration message, and the temporal sequence message, to dynamically adjust a motion of the virtual avatar and generate an adjustment record corresponding thereto, and allowing an input of a choreography note; storing the user posture, the adjustment record, and the choreography note together as a dance evidence message, and generating a hash message by hashing the dance evidence message, and signing the hash message using the creator private key to generate a signature message; deploying a storage location and a storage time of the dance evidence message, the signature message, and the creator public key to the blockchain network through a blockchain transaction technology, to serve as an evidence basis for a dance copyright.

To achieve the objective, the present invention discloses an evidence method for a dance copyright based on a virtual avatar, and the evidence method includes steps of: connecting a motion capture device to a computer host, wherein the computer host is connected to a blockchain network and served as one of node hosts of the blockchain network, and configured to store a creator private key and a creator public key corresponding to the stored creator private key; continuously capturing a user posture through sensors and a motion capture technology, by the motion capture device, wherein the user posture comprises a position vector message, a posture vector message, a velocity and acceleration message, and a temporal sequence message; receiving the user posture captured by the motion capture device, combine the captured the user posture with an imaging technology to generate a virtual avatar, wherein the virtual avatar maintains motion consistent with the user posture, by the computer host; after the virtual avatar is generated, allowing adjustment of at least one of the position vector message, the posture vector message, the velocity and acceleration message, and the temporal sequence message to dynamically adjust a motion of the virtual avatar and generate an adjustment record corresponding thereto, and allowing the input of a choreography note, by the computer host; storing the user posture, the adjustment record, and the choreography note together as a dance evidence message, generating a hash message by hashing the dance evidence message, and then signing the hash message using the creator private key to generate a signature message, by the computer host; deploying a storage location and a storage time of the dance evidence message, the signature message, and the creator public key to the blockchain network through a blockchain transaction technology, to serve as an evidence basis for dance copyright, by the computer host.

According to the system and method of the invention, the difference between the present invention and the conventional technology is that, in the present invention, the user posture can be captured through sensors and a motion capture technology, the user posture can be combined with the imaging technology to generate the virtual avatar, and the motion of the virtual avatar can be kept consistent with the user posture; after the virtual avatar is generated, the motion of the virtual avatar can be dynamically adjusted and the adjustment record corresponding thereto is generated, the input of the choreography note is allowed; the user posture, the adjustment record, and the choreography note together can be stored as the dance evidence message, the dance evidence message can be signed and deployed to the blockchain network 130 as an evidence basis for dance copyright.

Therefore, the above-mentioned solution of the present invention can achieve the technical effect of improving the evidence convenience and undeniability of dance copyright.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
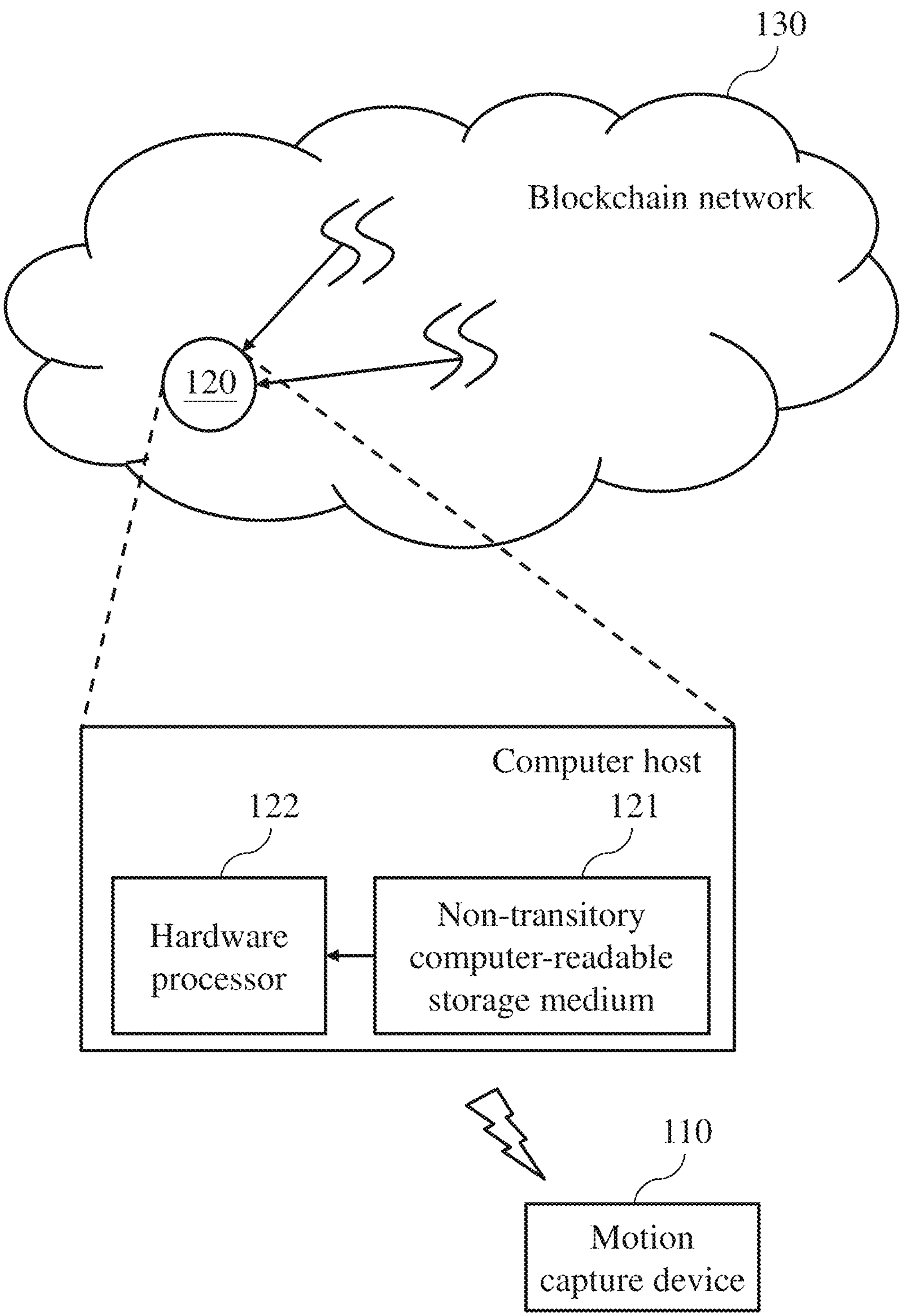
FIG. 1 is a system block diagram of an evidence system for a dance copyright based on a virtual avatar, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions, and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms “a”, “an” and “the” are intended to include the plural forms as well, unless the context clearly indicates otherwise. As used herein, the term “or” includes any and all combinations of one or more of the associated listed items.

It will be acknowledged that when an element or layer is referred to as being “on”, “connected to” or “coupled to” another element or layer, it can be directly on, connected or coupled to the other element or layer, or intervening elements or layers may be present. In contrast, when an element is referred to as being “directly on”, “directly connected to” or “directly coupled to” another element or layer, there are no intervening elements or layers present.

In addition, unless explicitly described to the contrary, the words “comprise” and “include”, and variations such as “comprises”, “comprising”, “includes”, or “including”, will be acknowledged to imply the inclusion of stated elements but not the exclusion of any other elements.

Please refer to FIG. 1. FIG. 1 is a system block diagram of an evidence system for dance copyright based on virtual avatar, according to the present invention. As shown in FIG. 1, the system includes a motion capture device 110 and a computer host 120. The motion capture device 110 is configured to continuously capture a user posture through sensors and a motion capture technology, the user posture comprises a position vector message, a posture vector message, a velocity and acceleration message, and a temporal sequence message. In actual implementation, one of the sensors can be worn on joints, limbs, torso, or head of a dancer to accurately capture the dancer’s dance motion in a three-dimensional space and can transmit the captured data as the user posture to the computer host 120 in real time for further processing.

In practice, the user posture can be stored in a structured document format (e.g., JSON, XML, etc.), and dynamic adjustment of at least one of the position vector message, the posture vector message, the velocity and acceleration message, and the temporal sequence message is allowed through an application programming interface, and a corresponding timestamp is continuously generated to embed into the adjustment record based on a time point during adjustment. The difference between the temporal sequence message and the timestamp is that the former records what the dance motion was performed at different time points, while the latter records at what time point the dance motion was adjusted. Additionally, the adjustment record and the choreography note can be edited and shared by different node hosts jointly, after the adjustment record and the choreography note is edited completely, the blockchain address of the corresponding node host is embedded with the edited files as a basis for identifying creator identity, because the blockchain address is unique.

The computer host 120 is connected to the motion capture device 110, connected to the blockchain network 130 and served as one of node hosts in the blockchain network 130. The computer host 120 includes a non-transitory computer-readable storage medium 121 and a hardware processor 122. The non-transitory computer-readable storage medium 121 is configured to store computer readable instructions, a creator private key and a creator public key corresponding to the stored creator private key. In actual implementation, the non-transitory computer-readable storage medium 121 may include a hard disk, an optical disk, a flash memory, or the like. The computer readable instructions can be executed by the computer host 120. The computer readable instructions can be assembly language instructions, instruction-set-structure instructions, machine instructions, machine-related Instructions, micro-instructions, firmware instructions, or source codes or object codes written in any combination of one or more programming languages. The programming language includes object-oriented programming languages, such as: Common Lisp, Python, C++, Objective-C, Smalltalk, Delphi, Java, Swift, C#, Perl, Ruby, or PHP; the programming language can include regular procedural programming languages, such as C language or similar programming languages. In actual implementation, the non-transitory computer-readable storage medium 121 can store a pre-trained dance suggestion model, the dance suggestion model refers to generative artificial intelligence, which is an artificial intelligence technology capable of generating new content or suggestions based on input data. Such models are typically trained on large dataset to learn various dance styles, motion modes, and their relationships. Further, the generative artificial intelligence analyzes the user posture data in consideration of number of dancers and specified difficulty and uses deep learning algorithms to generate a dance suggestion message that meets the requirements. The dance suggestion message can include the quantified user posture (i.e., the dance motion), and the fluidity and rhythm of motions, and transition techniques in the dance along with temporal sequence messages; in the other words, the dance suggestion message can specify performing a certain motion at a specific time point or completing a motion within a given time. The dance suggestion model can self-optimize over time, to improve the accuracy and adaptability of its suggestions, to make dance creation more efficient and provide dancers with customized choreography inspiration.

The hardware processor 122 is electrically connected to the non-transitory computer-readable storage medium 121, configured to execute the computer readable instructions, so that the hardware processor 122 can receive the user posture captured by the motion capture device 110, and combine the received user posture with an imaging technology to generate a virtual avatar, to keep a motion of the virtual avatar consistent with the user posture; after the virtual avatar is generated, the hardware processor 122 can allow adjustment of at least one of the position vector message, the posture vector message, the velocity and acceleration message, and the temporal sequence message, to dynamically adjust the motion of the virtual avatar and generate an adjustment record corresponding thereto, and allow input of a choreography note; the hardware processor 122 can store the user posture, the adjustment record, and the choreography note together as a dance evidence message, generate a hash message by hashing the dance evidence message, and then sign the generated hash message using the creator private key to generate a signature message; the hardware processor 122 can deploy a storage location and a storage time of the dance evidence message, the signature message, and the creator public key to the blockchain network 130 through blockchain transaction technology, to serve as an evidence basis for dance copyright. In actual implementation, the blockchain network 130 can include a verification smart contract, and when one of the node hosts executes the verification smart contract, the dance evidence message can be loaded based on the storage location, the hash value of the dance evidence message is calculated to compare with the hash message obtained by decrypting with the creator public key, when the calculated hash value matches the hash message, a verification success message is output; when the calculated hash value does not match the hash message, a verification failure message is output; after the verification success message is output, the loaded dance evidence message is combined with the imaging technology to generate the virtual avatar, and the virtual avatar is then displayed. Therefore, the user can view the dance motion more intuitive through the virtual avatar, and even perform visual comparisons, so that the user does not need conventional methods relying on the choreography note to imagine the corresponding dance motion in the mind. Additionally, in a condition that the non-transitory computer-readable storage medium 121 stores a pre-trained dance suggestion model, the computer host 120 can input the captured user posture and a prompt word into the dance suggestion model to output a dance suggestion message, thereby automatically adjusting at least one of the position vector message, the posture vector message, the velocity and acceleration message, and the temporal sequence message based on the dance suggestion message. The prompt word comprises a dance style, a difficulty, and a number of dancers. For example, in a condition that the prompt word is "street dance, difficulty being medium, three dancers", when the user posture and the prompt word are input into the dance suggestion model, the dance suggestion message output by the dance suggestion model is a medium-difficulty street dance for 3 dancers.

It is to be particularly noted that, in actual implementation, the above-mentioned solution of the present invention can be implemented fully or partly based on hardware, for example, the hardware processor 122 of the system can be implemented by integrated circuit chip, system on chip (SoC), a complex programmable logic device (CPLD), or a field programmable gate array (FPGA). The non-transitory computer-readable storage medium 121 of the present invention records computer readable program instructions, and the hardware processor 122 can execute the computer readable program instructions to implement concepts of the present invention. The non-transitory computer-readable storage medium 121 can be a tangible apparatus for holding and storing the instructions executable of an instruction executing apparatus. The non-transitory computer-readable storage medium 121 can be, but not limited to electronic storage apparatus, magnetic storage apparatus, optical storage apparatus, electromagnetic storage apparatus, semiconductor storage apparatus, or any appropriate combination thereof. More particularly, the non-transitory computer-readable storage medium 121 can include a hard disk, an RAM memory, a read-only-memory, a flash memory, an optical disk, a floppy disc, or any appropriate combination thereof, but this exemplary list is not an exhaustive list. The non-transitory computer-readable storage medium 121 is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the non-transitory computer-readable storage medium 121 to each calculating/processing apparatus, or downloaded through network, such as internet network, local area network, wide area network and/or wireless network, to external computer equipment or external storage apparatus. The blockchain network 130 includes copper transmission cable, fiber transmission, wireless transmission, router, firewall, switch, hub and/or gateway. The network card or network interface of each calculating/processing apparatus can receive the computer readable program instructions from network and forward the computer readable program instruction to store in non-transitory computer-readable storage medium 121 of each calculating/processing apparatus.

Figure 2A:
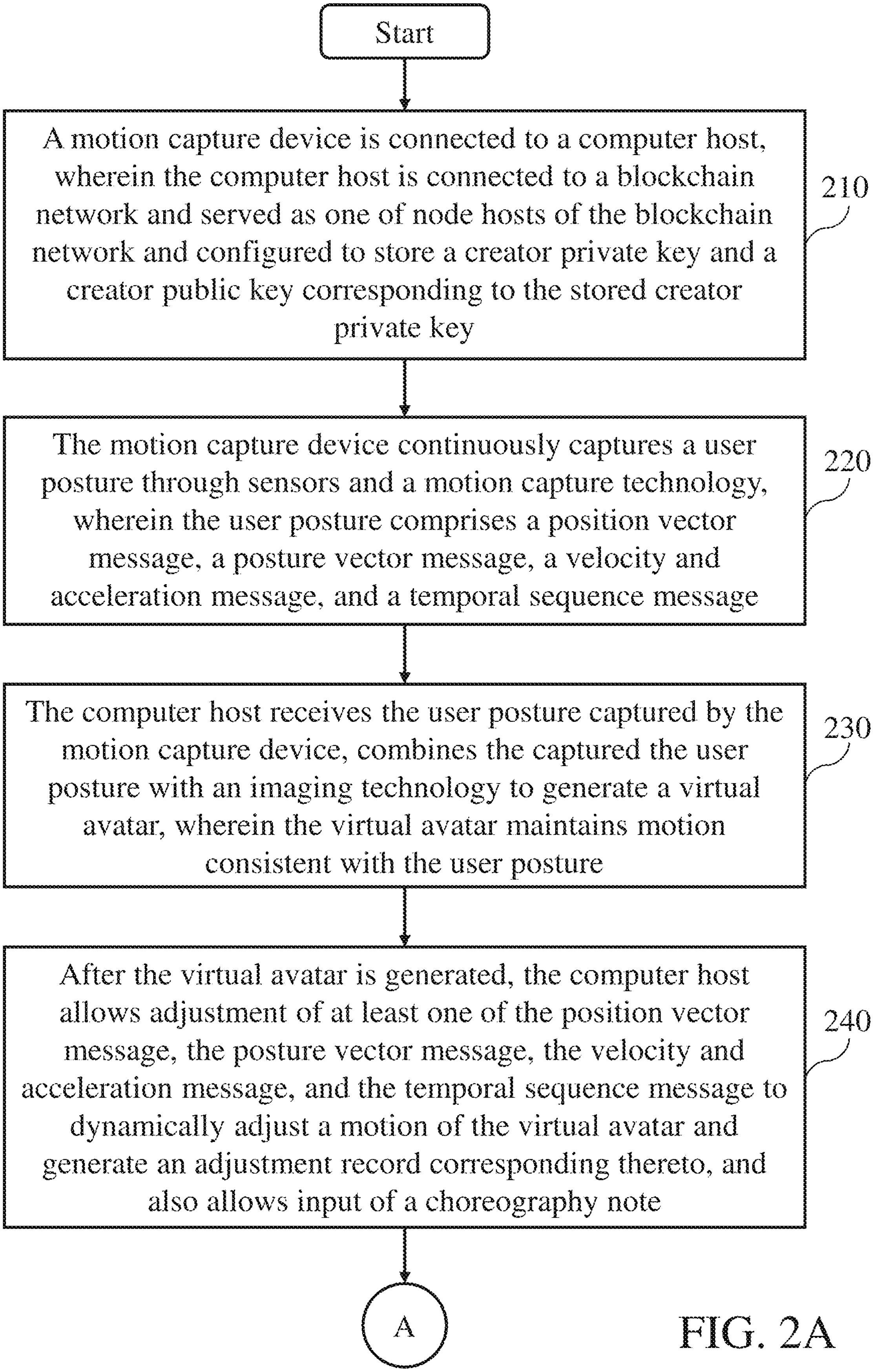
FIG. 2A and FIG. 2B are flowcharts of an evidence method for a dance copyright based on a virtual avatar, according to the present invention.
Figure 2B:
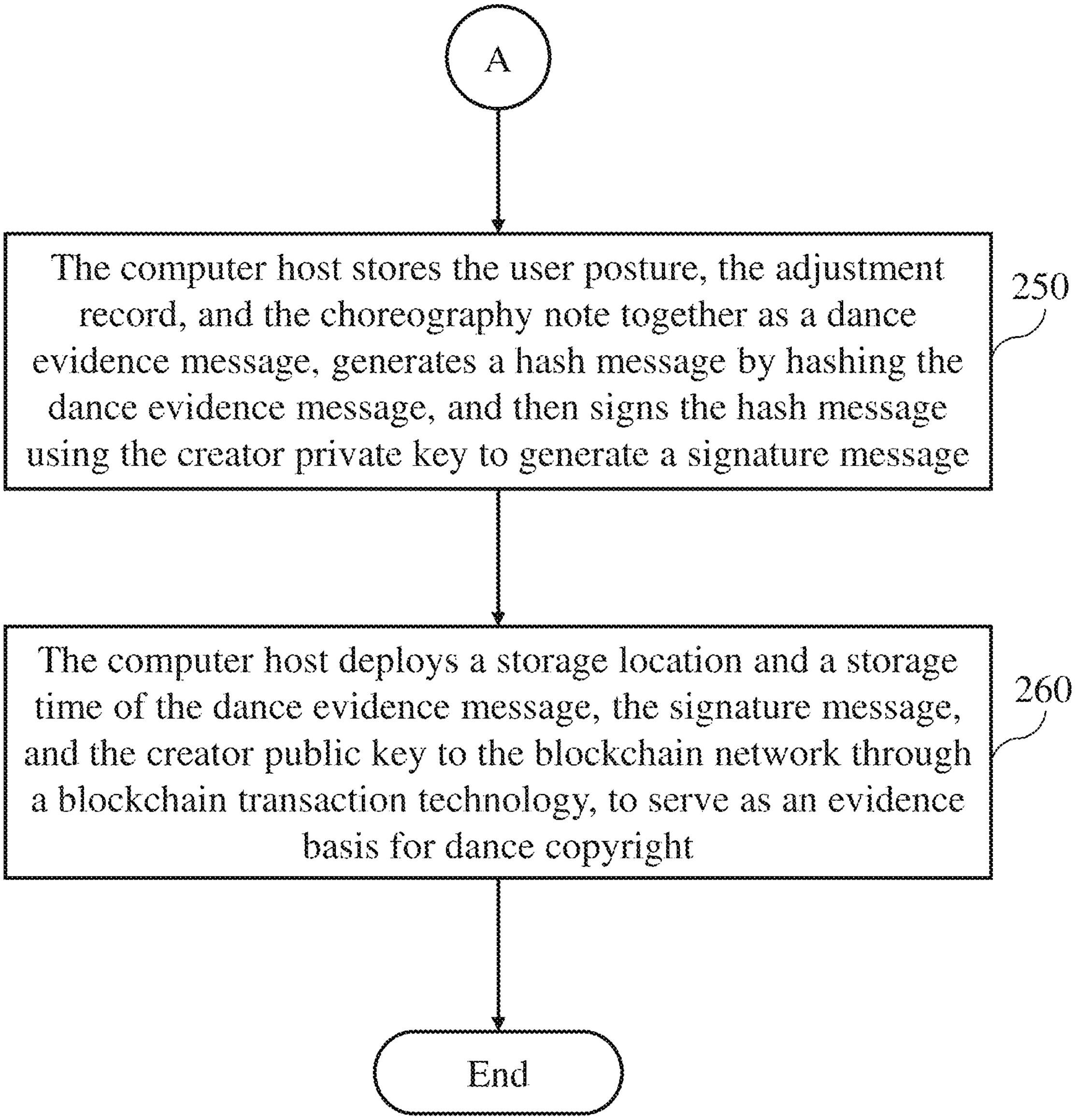

Please refer to FIG. 2A and FIG. 2B. FIG. 2A and FIG. 2B are flowcharts of an evidence method for dance copyright based on virtual avatar, according to the present invention. As shown in FIG. 2A and FIG. 2B, in a step 210, a motion capture device 110 is connected to a computer host 120, wherein the computer host 120 is connected to a blockchain network and served as one of node hosts of the blockchain network and configured to store a creator private key and a creator public key corresponding to the stored creator private key. In a step 220, the motion capture device 110 continuously captures a user posture through sensors and a motion capture technology, wherein the user posture comprises a position vector message, a posture vector message, a velocity and acceleration message, and a temporal sequence message. In a step 230, the computer host 120 receives the user posture captured by the motion capture device 110, combines the captured the user posture with an imaging technology to generate a virtual avatar, wherein the virtual avatar maintains motion consistent with the user posture. In a step 240, after the virtual avatar is generated, the computer host 120 allows adjustment of at least one of the position vector message, the posture vector message, the velocity and acceleration message, and the temporal sequence message to dynamically adjust a motion of the virtual avatar and generate an adjustment record corresponding thereto, and also allows input of a choreography note. In a step 250, the computer host 120 stores the user posture, the adjustment record, and the choreography note together as a dance evidence message, generates a hash message by hashing the dance evidence message, and then signs the hash message using the creator private key to generate a signature message. In a step 260, the computer host 120 deploys a storage location and a storage time of the dance evidence message, the signature message, and the creator public key to the blockchain network through a blockchain transaction technology, to serve as an evidence basis for dance copyright. Through aforementioned steps, the user posture can be captured through sensors and a motion capture technology, the user posture can be combined with the imaging technology to generate the virtual avatar, and the motion of the virtual avatar can be kept consistent with the user posture; after the virtual avatar is generated, the motion of the virtual avatar can be dynamically adjusted and the adjustment record corresponding thereto is generated, the input of the choreography note is allowed; the user posture, the adjustment record, and the choreography note together can be stored as the dance evidence message, the dance evidence message can be signed and deployed to the blockchain network 130 as an evidence basis for dance copyright.

Figure 3:
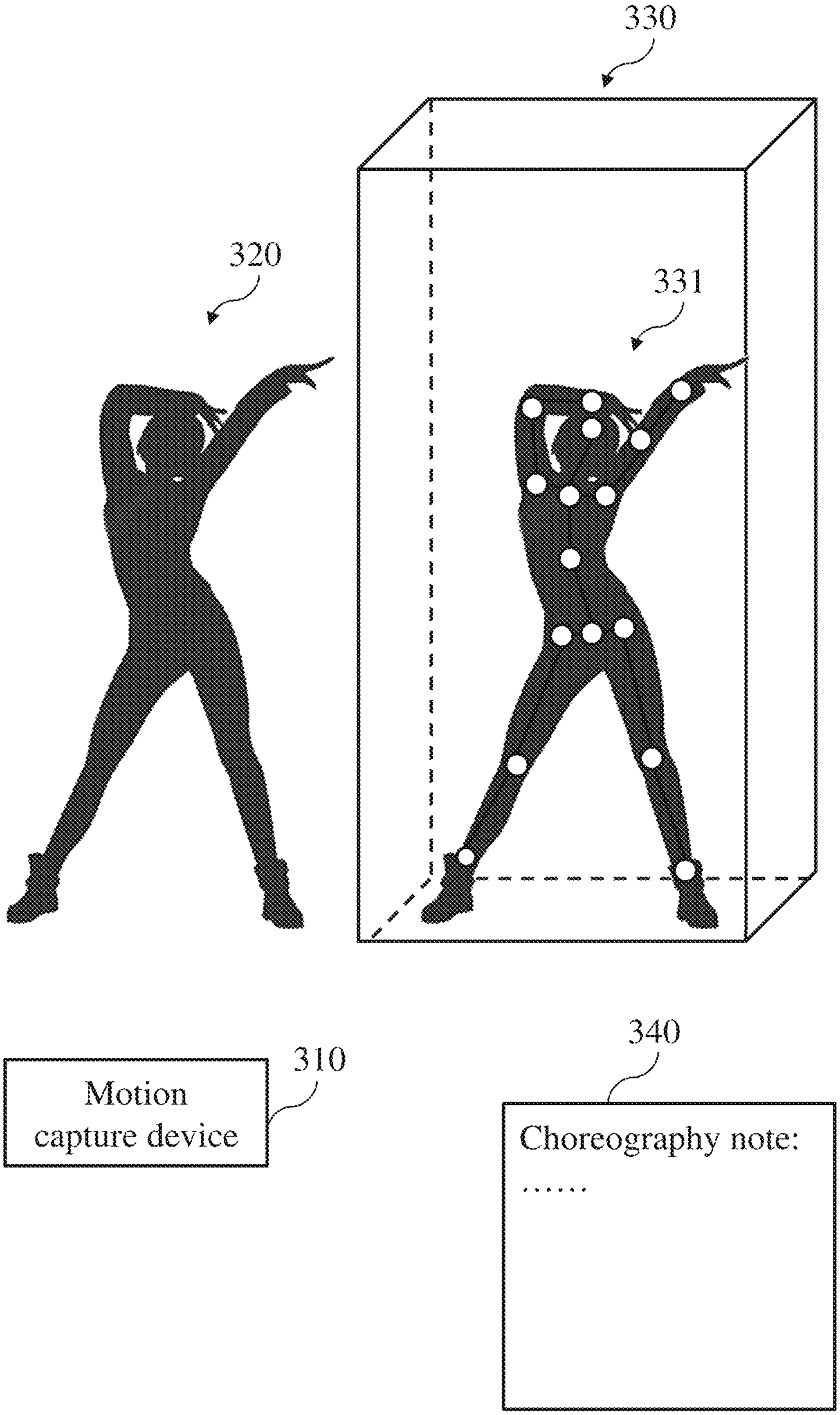
FIG. 3 is a schematic view of an operation of generating evidence data for dance copyright, according to an application of the present invention.

The embodiment of the present invention will be illustrated in the following paragraphs with reference to FIG. 3 and FIG. 4. As shown in FIG. 3, which is a schematic view of an operation of generating evidence data for dance copyright, according to an application of the present invention. In actual implementation, a motion capture device 310 and the computer host 120 are connected to each other via a wired or wireless manner. The computer host 120 is served as one of the nodes (also called node hosts) in the blockchain network 130, for example, a blockchain client program can be executed to join the computer host 120 into the blockchain network 130, to obtain a unique blockchain address and synchronize blockchain data, thereby enabling blockchain transactions and smart contract execution. Furthermore, the computer host 120 stores a key pair including the creator private key and the creator public key corresponding thereto. When a dance creator 320 creates a dance, the sensors (e.g., the sensors worn by the dance creator 320) combined with advanced motion capture technology can continuously capture a user posture of the dance creator 320. The user posture can include quantified data, such as the position vector message, the posture vector message, the velocity and acceleration message, and the temporal sequence message.

When the computer host 120 receives the user posture, the computer host 120 uses the imaging technology to generate a virtual avatar 331 in a three-dimensional space 330 and ensures that a motion of the virtual avatar 331 remains consistent with the user posture. After the virtual avatar 331 is generated, the dance creator 320 can play the motion of the virtual avatar 331 and adjust certain parameters of the user posture, such as at least one of the position vector message, the posture vector message, the velocity, acceleration message, and the temporal sequence message. Therefore, the motion of the virtual avatar 331 can be adjusted in real time and a corresponding adjustment record can be dynamically generated. Furthermore, during the above-mentioned adjustment process, the dance creator 320 can also input a choreography note through a graphical user interface 340.

The computer host 120 combines all data including the user posture, the adjustment record, and the choreography note together, and stores the combined data as the dance evidence message, the computer host 120 performs a hashing calculation (e.g., MD5) on the dance evidence message to generate the hash message, and then signs the hash message with the creator private key to generate a signature message. The computer host 120 then deploys the storage location and the storage time of the dance evidence message, the signature message, and the creator public key to the blockchain network 130 through a blockchain transaction technology as strong evidence for dance copyright. The storage time represents the creation time of the dance, and the time point at which the dance copyright is obtained.

Figure 4:
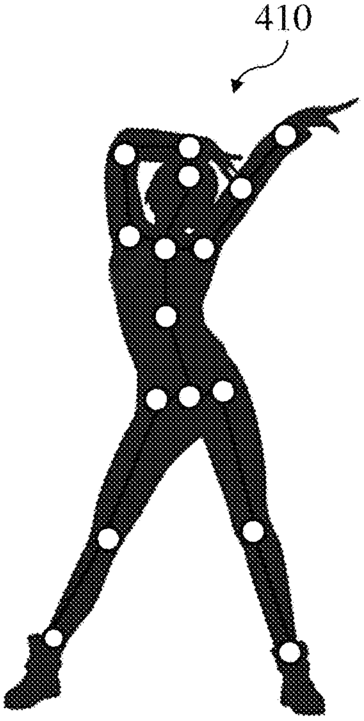
FIG. 4 is a schematic view of an operation of dynamically adjusting a dance motion of a virtual avatar, according to an application of the present invention.

As shown in FIG. 4, which is a schematic view of an operation of dynamically adjusting dance motion of a virtual avatar, according to an application of the present invention. In actual implementation, the virtual avatar 410 generated by the computer host 120 can be displayed through virtual reality (VR), augmented reality (AR), mixed reality (MR), or similar technologies, on a headset, a glass-free 3D display, or a similar device. To adjust the dance motion of the virtual avatar 410, the corresponding dance evidence message 400 can be loaded from the blockchain network 130 for adjustment. For example, adjusting a position of the virtual avatar 410 can be implemented by adjusting the coordinates in the position vector message, adjusting a posture of the virtual avatar 410 can be implemented by changing the posture vector message, such as adjusting joint rotation angles, and so on. After the adjustment to the dance evidence message 400 is completed, the computer host 120 performs a hashing calculation on the adjusted dance evidence message 400, and signs it with the private key of the editor before deploying it to blockchain network 130. Therefore, this ensures transparency about who adjusted which motions, so that it is easier to adjust the dance motion of the virtual avatar 410, and details of the adjustment process can be recorded on the blockchain network 130. Therefore, the immutability and undeniability features of the blockchain network 130 effectively enhances the evidentiary strength of the dance copyright.

According to above-mentioned contents, the difference between the present invention and the conventional technology is that, in the present invention, the user posture can be captured through sensors and a motion capture technology, the user posture can be combined with a imaging technology to generate a virtual avatar, and a motion of the virtual avatar can be kept consistent with the user posture; after the virtual avatar is generated, the motion of the virtual avatar can be dynamically adjusted and an adjustment record corresponding thereto is generated, the input of a choreography note is allowed; the user posture, the adjustment record, and the choreography note together can be stored as a dance evidence message, the dance evidence message can be signed and deployed to the blockchain network as an evidence basis for dance copyright. Therefore, the above-mentioned solution of the present invention can solve the conventional problem and achieve the technical effect of improving the evidence convenience and undeniability of dance copyright.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An evidence system for dance copyright based on virtual avatar, comprising:

a motion capture device, configured to continuously capture a user posture through sensors and a motion capture technology, wherein the user posture comprises a position vector message, a posture vector message, a velocity and acceleration message, and a temporal sequence message;

a computer host, connected to the motion capture device, and connected to a blockchain network and served as one of node hosts of the blockchain network, wherein the computer host comprises:

a non-transitory computer-readable storage medium, configured to store computer readable instructions, a creator private key and a creator public key corresponding to the stored creator private key;

a hardware processor, electrically connected to the non-transitory computer-readable storage medium, and configured to execute the computer readable instructions to operate:

receiving the user posture captured by the motion capture device, and combining the user posture with an imaging technology to generate a virtual avatar, wherein the virtual avatar maintains motion consistent with the user posture;

after the virtual avatar is generated, allowing adjustment of at least one of the position vector message, the posture vector message, the velocity and acceleration message, and the temporal sequence message, to dynamically adjust a motion of the virtual avatar and generate an adjustment record corresponding thereto, and allowing an input of a choreography note;

storing the user posture, the adjustment record, and the choreography note together as a dance evidence message, and generating a hash message by hashing the dance evidence message, and signing the hash message using the creator private key to generate a signature message; and deploying a storage location and a storage time of the dance evidence message, the signature message, and the creator public key to the blockchain network through a blockchain transaction technology, to serve as an evidence basis for a dance copyright.

2. The evidence system for dance copyright based on virtual avatar according to claim 1, wherein the blockchain network includes a verification smart contract, and when one of the node hosts executes the verification smart contract, the dance evidence message is loaded based on the storage location, and the hash value of the dance evidence message is calculated, the calculated hash value is compared with the hash message obtained by decrypting with the creator public key, when the calculated hash value matches the obtained hash message, a verification success message is outputted, and when the calculated hash value does not match the obtained hash message, a verification failure message is output, and after the verification success message is output, the loaded dance evidence message is combined with the imaging technology to generate the virtual avatar, and the virtual avatar is displayed.

3. The evidence system for dance copyright based on virtual avatar according to claim 1, wherein the user posture is stored in a structured document format, and the adjustment of at least one of the position vector message, the posture vector message, the velocity and acceleration message, and the temporal sequence message dynamically is allowed through an application programming interface, and a timestamp is continuously generated and embedded into the adjustment record based on a time point during the adjustment.

4. The evidence system for dance copyright based on virtual avatar according to claim 1, wherein the adjustment record and the choreography note is allowed to be edited and shared by different node hosts jointly, and after editing is completed, a blockchain address of the corresponding node hosts is embedded into the edited adjustment record and the edited choreography note as a basis for identifying a creator identity.

5. The evidence system for dance copyright based on virtual avatar according to claim 1, wherein the computer host stores a pre-trained dance suggestion model, and allows input of the captured user posture and a prompt word into the dance suggestion model, to output a dance suggestion message, and at least one of the position vector message, the posture vector message, the velocity and acceleration message, and the temporal sequence message is automatically adjusted based on the dance suggestion message, wherein the prompt word comprises a dance style, a difficulty, and a number of dancers.

6. An evidence method for a dance copyright based on a virtual avatar, comprising:

connecting a motion capture device to a computer host, wherein the computer host is connected to a blockchain network and served as one of node hosts of the blockchain network, and configured to store a creator private key and a creator public key corresponding to the stored creator private key;

continuously capturing a user posture through sensors and a motion capture technology, by the motion capture device, wherein the user posture comprises a position vector message, a posture vector message, a velocity and acceleration message, and a temporal sequence message;

receiving the user posture captured by the motion capture device, combine the captured the user posture with an imaging technology to generate a virtual avatar, wherein the virtual avatar maintains motion consistent with the user posture, by the computer host;

after the virtual avatar is generated, allowing adjustment of at least one of the position vector message, the posture vector message, the velocity and acceleration message, and the temporal sequence message to dynamically adjust a motion of the virtual avatar and generate an adjustment record corresponding thereto, and allowing the input of a choreography note, by the computer host;

storing the user posture, the adjustment record, and the choreography note together as a dance evidence message, generating a hash message by hashing the dance evidence message, and then signing the hash message using the creator private key to generate a signature message, by the computer host; and deploying a storage location and a storage time of the dance evidence message, the signature message, and the creator public key to the blockchain network through a blockchain transaction technology, to serve as an evidence basis for dance copyright, by the computer host.

7. The evidence method for dance copyright based on virtual avatar according to claim 6, wherein the blockchain network includes a verification smart contract, and when one of the node hosts executes the verification smart contract, the dance evidence message is loaded based on the storage location, and the hash value of the dance evidence message is calculated, the calculated hash value is compared with the hash message obtained by decrypting with the creator public key, when the calculated hash value matches the obtained hash message, a verification success message is outputted, and when the calculated hash value does not match the obtained hash message, a verification failure message is output, and after the verification success message is output, the loaded dance evidence message is combined with the imaging technology to generate the virtual avatar, and the virtual avatar is displayed.

8. The evidence method for dance copyright based on virtual avatar according to claim 6, wherein the user posture is stored in a structured document format, and the adjustment of at least one of the position vector message, the posture vector message, the velocity and acceleration message, and the temporal sequence message dynamically is allowed through an application programming interface, and a timestamp is continuously generated and embedded into the adjustment record based on a time point during the adjustment.

9. The evidence method for dance copyright based on virtual avatar according to claim 6, wherein the adjustment record and the choreography note is allowed to be edited and shared by different node hosts jointly, and after editing is completed, a blockchain address of the corresponding node hosts is embedded into the edited adjustment record and the edited choreography note as a basis for identifying a creator identity.

10. The evidence method for dance copyright based on virtual avatar according to claim 6, wherein the computer host stores a pre-trained dance suggestion model, and allows input of the captured user posture and a prompt word into the dance suggestion model, to output a dance suggestion message, and at least one of the position vector message, the posture vector message, the velocity and acceleration message, and the temporal sequence message is automatically adjusted based on the dance suggestion message, wherein the prompt word comprises a dance style, a difficulty, and a number of dancers.

* * * * *